United States Patent Office

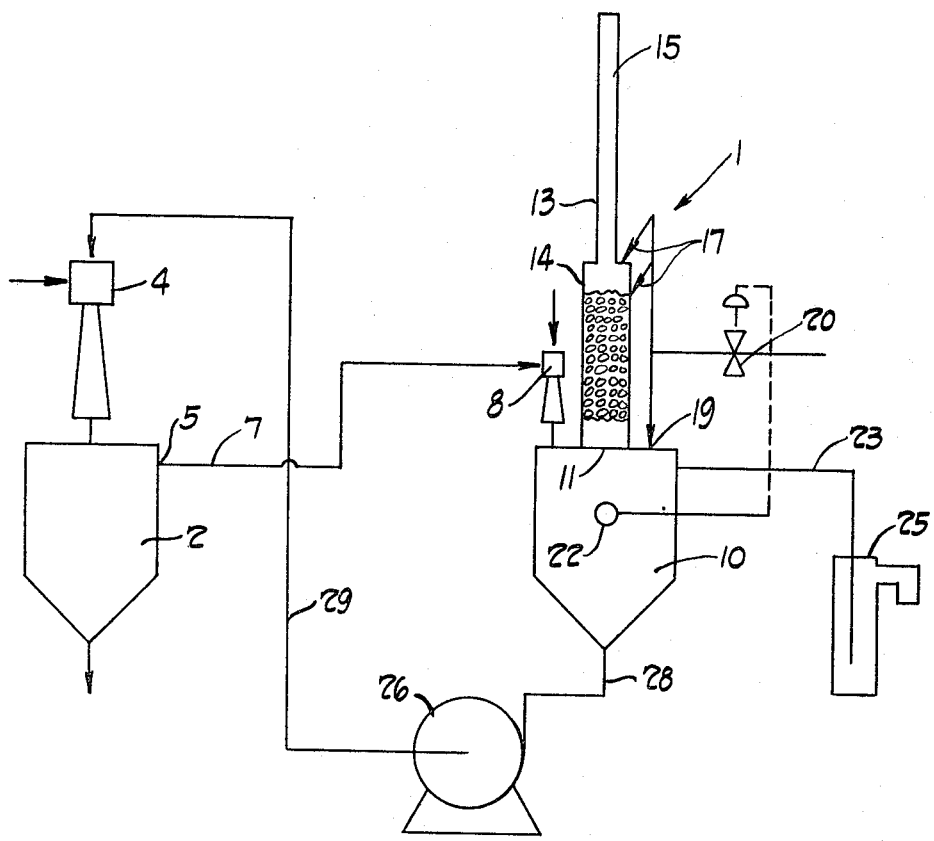

3,335,548
Patented Aug. 15, 1967

3,335,548
METHOD AND APPARATUS FOR THE RECOVERING AND RECYCLING OF CARBON BLACK FINES
Dale Lynn Harmon, Dunbar, Robert Lee Scalise, South Charleston, and Charles Duffield Kuntz, St. Albans, W. Va., assignors to Goodrich-Gulf Chemicals, Inc., Cleveland, Ohio, a corporation of Delaware
Filed Dec. 30, 1964, Ser. No. 422,292
3 Claims. (Cl. 55—89)

This invention relates to a method and apparatus for recovering carbon black fines and more particularly to a method and apparatus for recovering carbon black fines from the steam and non-condensable gases which discharge from a carbon black slurry funnel while making a carbon black slurry for use in the manufacture of rubber.

It is well known to treat rubber latex, prior to coagulation, with a water slurry of carbon black to incorporate the carbon in the latex to make a black rubber. The carbon slurry is prepared and collected prior to usage in a tank or vessel commonly known as a slurry funnel.

A gaseous effluent comprising non-condensable gases, residual steam and entrapped carbon black fines is discharged or vented from the slurry funnel during operation thereof. In the past difficulty has been experienced in separating or removing the entrapped carbon black fines from the gaseous effluent of the slurry funnel, with the result that considerable carbon black has been lost through the exhaust stacks with the non-condensable gases or carried off with the water effluent used in an effort to remove the fines and condense the vented steam. This practice has proven unsatisfactory, not only because of the loss of unused carbon black, but, also, because of the damage and housekeeping problems, and the expense thereof, caused by the carbon fines which escaped into the atmosphere.

Unsatisfactory results were obtained even though the gaseous effluent of the slurry funnel was subjected to multiple countercurrent water sprays, apparently because the sprays and the steam condensed thereby did not sufficiently wet all the carbon fines to ensure their removal from the non-condensable gases.

Accordingly, the general object of this invention is the provision of a new and improved method and apparatus for removing carbon black fines, and the like, from non-condensable gaseous effluent.

Other objects of this invention is the provision of a new and improved method and apparatus for removing carbon black fines from the gaseous effluent of a carbon black slurrying process and the provision of such a method and apparatus which recovers and recycles the carbon black removed from the non-condensable gases without otherwise interfering with the carbon black slurrying process.

Still other objects of this invention include the provision of a new and improved method and apparatus for removing carbon black fines, and the like, entrapped in non-condensable gaseous effluent which is safe and effective in operation; which is of increased efficiency over prior known methods and apparatus; which removes and recovers the carbon black fines for recycling; which efficiently and effectively wets substantially all of the entrapped carbon black fines; and, which eliminates the need to discharge and waste the water used to remove the carbon black fines, the carbon black fines removed and the steam, if any, condensed during removal of the carbon black fines.

Still another object of this invention is to provide a new and improved method and apparatus for removing carbon black fines from non-condensable gaseous effluent attaining one or more of the objects set forth above.

These and other objects and advantages of this invention will appear from the following description of preferred forms thereof, reference being had to the accompanying drawing in which apparatus embodying, and useful in practicing the method embodying this invention is shown schematically.

Briefly, the new and improved method embodying this invention is for the removal of carbon black fines from the gaseous effluent, including carbon black fines, steam and noncondensable gases, of a tank or vessel in which carbon slurry is formed from steam and carbon black. The method comprises the steps of thoroughly and completely wetting and admixing the noncondensable gases, steam and entrapped carbon black fines in a water jet to thoroughly mix and wet the carbon black fines and condense the steam, conducting the condensed and wetted mixture to a separating tank, separating the non-condensable gaseous and remaining entrapped solids from the liquid and wetted fines by settling, venting the non-condensable gas and remaining entrapped solids from the separating tank through an exhaust stack packed with Berl saddles or similar media, washing the gaseous effluent from the separating tank in the exhaust stack with a counter current water spray, returning the water spray to the separating tank, withdrawing the removed carbon black fines from the settling tank as a water-carbon black slurry, and recovering the carbon black fines by recycling the water-carbon black fine slurry from the separating tank into the first slurry forming tank through the motive side of the water jet by which the fresh charge of steam and carbon black is charged into the slurry forming tank.

This new method not only provides improved and effective wetting of carbon fines carried off in the noncondensable gases escaping from the slurry tank in a carbon black operation, so that the same are removed and prevented from escaping to the atmosphere, but also provides for the recovering and recycling of the entrapped and removed carbon black fines, together with the water used for removal thereof, to obtain increased efficiency in carbon black slurry formation and to, also, obviate the necessity of discharging the carbon black fines in liquid effluent.

A typical apparatus by which the process of this invention can be accomplished is indicated generally at 1 in the drawing.

Carbon black is prepared for admixture with rubber latex during coagulation, by condensation from a steam-carbon black mixture in a tank or slurry funnel 2. Slurry funnel 2 is charged by a water jet or fume scrubber 4, having steam and carbon black connected to its suction side.

Non-condensable gases, and uncondensed steam cannot escape from the slurry funnel 2 via the fume-scrubber 4, but are discharged or vented therefrom, together with entrapped carbon black fines, through exit port 5.

The above apparatus is old and well known in the art and, per se, forms no part of the instant invention.

Apparatus 1 comprises means, such as a conduit 7, for conducting gaseous efficient, including steam, non-condensable gases and entrapped carbon black fines, from port 5 of slurry funnel 2 and feeding it into the suction side of a second water jet or eductor 8.

Water provides the motive power for jet 8 and jet 8 provides the intimate mixing and wetting of the entrapped carbon black fines required of the process of this invention, as well as condensing the steam in the slurry funnel effluent. Jet 8 discharges the water-gas-carbon black fines mixture into a separating and settling tank or after-scrubber funnel 10. The wetted carbon black fines in the funnel 10 settle to the bottom of the funnel while uncondensed gases escape through exhaust port 11 at the top of funnel 10, into a stack 13. Stack 13 preferably comprises an enlarged lower section 14, packed with Berl saddles or similar media, and an upper, narrower section 15, of indeterminate length, for venting the non-condensable gases out of the building and into the atmosphere. Conveniently, stack section 14 may be 6 feet tall and 12 inches in diameter.

In order to remove the final traces of the entrapped fines from the gas vented from funnel 10, water nozzles 17 are mounted at and near the top of stack section 14 to direct a water spray countercurrent to the flow of the exhaust gases. Preferably two such nozzles are provided and the sprays from nozzles 17 also wash carbon black fines caught in the packing downwardly into funnel 10. Additional make-up water is put into funnel 10 directly through one or more nozzles 19 and the additional water flow through nozzles 17 and 19 and, ultimately, into funnel 10, is controlled by valve 20, which, in turn, is controlled by means of a float control disposed in funnel 10.

A by-pass exhaust or gas vent 23 having a water seal 25, is, also, provided from funnel 10, as a safety measure in case of malfunctions.

Pump 26 withdraws the settled slurry, from the bottom of funnel 10, through conduit 28, and feeds it, through conduit 29, to the motive side of fume scrubber or jet 4, where it provides part of the make-up, including part of the carbon black, for the slurry funnel 2 by recycling the carbon black fines recovered in apparatus 1 into the funnel.

Modifications, changes and improvements in the preferred forms of the invention herein particularly disclosed and described may occur to those skilled in the art who come to understand the principles and precepts thereof. Accordingly, the scope of the patent issued hereon should not be limited to the specific forms of the invention herein particularly illustrated, disclosed and described, but only consistent with the advance by which the invention has promoted the art.

It is intended that the patent shall cover, by summarization in appended claims, all features of patentable novelty residing in the invention.

We claim:

1. A new process for separating carbon black fines from the gaseous effluent, including steam, non-condensable gases and entrapped carbon black fines, of a carbon black slurry funnel comprising the steps of substantially completely wetting and admixing said carbon black fines and gaseous effluent, condensing said steam with water in a water jet, conducting the resulting mixture to a separating tank, separating the gaseous components and remaining unwetted fines from the liquid components and wetted fines, conducting the gaseous components and remaining unwetted fines through a packed column, washing said components and fines in said column with a counter current water spray, returning the water spray and carbon black fines recovered therein to the separating tank, withdrawing the carbon black fines from the separating tank as a water-carbon black suspension, and recycling such suspension into said carbon black slurry funnel through the motive side of a water jet by which steam and carbon black are mixed and charged into said funnel.

2. In apparatus for making a slurry of carbon black and water including a slurry funnel with an outlet for the removal of gaseous effluent and a water jet for mixing and feeding steam and carbon black into said slurry funnel, the improvement comprising a separating tank, a second water jet capable of receiving said gaseous effluent, wetting the entrapped carbon black fines, condensing the steam and charging said separating tank, means connecting said second water jet with said slurry funnel to conduct said gases and entrapped fines from said slurry funnel outlet to said second water jet, a packed exhaust stack having lower and upper portions leading from said separating tank, said lower portion being enlarged relative to said upper portion, a plurality of nozzles directing a water spray into said lower portion of said exhaust stack and at least one nozzle directing water into said separating tank, a valve means for controlling the flow of water through said nozzles, a liquid level float control in said separating tank controlling said valve means, a by-pass exhaust leading from said separating tank, a water leg seal in said by-pass exhaust, a slurry pump, and conduits connecting said slurry pump with the bottom of said separating tank and the motive side of said first-mentioned water jet.

3. In apparatus for making a slurry of carbon black and water including a slurry funnel with an outlet for the removal of gaseous effluent and a water jet for mixing and feeding steam and carbon black into said slurry funnel, the improvement comprising a separating tank, a second water jet, capable of receiving said gaseous effluent, wetting said carbon black fines, and charging said separating tank, means connecting the suction side of said second water jet with said slurry funnel to conduct said gaseous effluent and entrapped fines from said slurry funnel outlet to said second water jet, a packed exhaust stack having lower and upper portions leading from said separating tank, said lower portion being enlarged relative to said upper portion, a plurality of nozzles directing a water spray into said lower portion of said exhaust stack and at least one nozzle directing water into said separating tank, a level-responsive valve for controlling the flow of water through said nozzles, a pump for withdrawing slurry from the bottom of said separating tank and feeding it into the motive side of said first-mentioned water jet, and conduits connecting said pump with the bottom of said separating tank and the motive side of said first-mentioned water jet.

References Cited

UNITED STATES PATENTS

| | | | |
|---|---|---|---|
| 809,383 | 1/1906 | Lowe | 55—94 X |
| 2,127,571 | 8/1938 | Pardee | 55—94 X |
| 2,523,441 | 9/1950 | McKamy | 55—223 |
| 2,585,659 | 2/1952 | Kilpatrick | 55—94 X |
| 2,746,564 | 5/1956 | Williams | 55—94 X |
| 3,008,807 | 11/1961 | Hilgert et al. | 55—94 X |
| 3,212,235 | 10/1965 | Markant | 55—94 X |

REUBEN FRIEDMAN, *Primary Examiner.*

J. W. ADEE, *Assistant Examiner.*